Jan. 19, 1926.

W. E. BEARD

SAFETY SIGNAL

Filed Nov. 1, 1923

1,569,907

Witnesses:

Inventor
WILLIAM E. BEARD

By Richard B. Owen.
Attorney

Patented Jan. 19, 1926.

1,569,907

UNITED STATES PATENT OFFICE.

WILLIAM E. BEARD, OF BUCKNER, MISSOURI.

SAFETY SIGNAL.

Application filed November 1, 1923. Serial No. 672,231.

*To all whom it may concern:*

Be it known that I, WILLIAM E. BEARD, a citizen of the United States, residing at Buckner, in the county of Jackson and State of Missouri, have invented certain new and useful Improvements in Safety Signals, of which the following is a specification.

The present invention relates to safety signal particularly adapted for use upon automobiles and the like and has for its principal object to provide a device of this nature which may be used as the ordinary tail light of an automobile or for the purpose of a parking light.

A particular and important object of the invention is to provide a signal light of this nature which will be effective even though the electric bulb therein burns out or become out of order in any other manner.

It frequently occurs that something happens to the tail light of an automobile and the driver of the car is not aware of the fact until it is called to his attention and there is, therefore, considerable danger of some other machine running into him from the rear. With my present device such an accident is not probable because the headlights of the machine coming up in the rear will shine upon this safety signal and cause the light to be reflected backwardly toward the on-coming machine and to warn him in plenty of time.

With the above and numerous other objects in view as will appear as the description progresses, the invention resides in certain novel features of construction, and in the combination and arrangement of parts as will be hereinafter more fully described and claimed.

Figure 1:
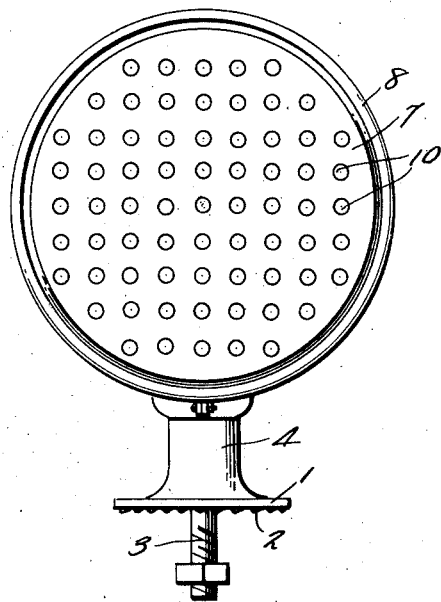
Figure 1 is an elevation of the signal light embodying my invention.
Figure 2:
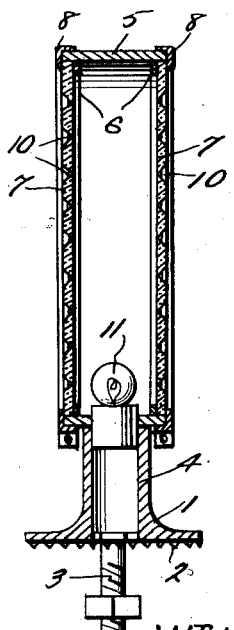
Figure 2 is a vertical section therethrough.
Figure 3:
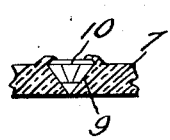
Figure 3 is an enlarged detail section through one of the panels.

Referring to the drawing in detail it will be seen that 1 designates a base which in the present instance is provided with a plurality of projections 2 on its under surface so that it may be firmly engaged with a fender or some other similar part of a vehicle by a bolt 3 and be prevented from rotation. A hollow upstanding sleeve 4 is formed on the base 1 and a cylindrical casing 5 is mounted thereon. A pair of beads 6 are provided in the casing 5 adjacent its ends and panels 7 are disposed in the casing so that their rear faces abut the beads 6 being in place by rims 8. The panels 7 are formed of transparent material and the rear one will preferably be colored red while the front one would be colored white or green as might be desired. Each panel is provided with a plurality of conical depressions 9 for receiving conical shaped glass blocks 10 which are suitably silvered and the bases thereof are disposed substantially co-planer with the exterior face of the panel.

A source of illumination 11 preferably an incandescent bulb is disposed within the casing between the panel 7, the socket thereof extending through the casing into the sleeve 4. When this incandescent bulb 11 is lighted the device is very similar to the ordinary parking light now commonly in use. Should, however, the incandescent light burn out or become otherwise out of order it will be seen that the headlights of an on-coming machine would be reflected by the blocks 10 and that the lamp would be just as efficient as though the electric bulb were in operation.

It is also to be noted that the device embodies a simple and efficient construction which is reliable, inexpensive to manufacture, and well adapted for the purpose designed.

Although I have described my device with a certain degree of particularity, it is evident that numerous changes in the details of construction and in the combination and arrangement of parts may be resorted to without departing from the spirit or scope of the invention as hereinafter claimed or sacrificing any of its advantages.

What is claimed is:

1. In a lamp, a casing, a closure panel for the casing formed of light transmitting material and having a plurality of conical spaced depressions in its outer surface, and a conical shaped transparent block secured in each depression so that its base is in substantially co-planer relation with and exposed at the outer face of the panel, the transparent blocks having their surfaces silvered from base to apex whereby light from within the casing may pass through the panel between the depressions, and whereby light from the outside of the casing will be reflected outwardly of the casing by the blocks.

2. A closure panel for lamp casings formed of light transmitting material and having a plurality of transparent blocks embedded therein in spaced relation whereby light may pass outwardly through the intervening portions of the panel, said blocks having their inner surfaces silvered whereby light will be reflected outwardly thereby.

3. In a lamp, a casing, a closure panel for the casing formed of light transmitting material and having a plurality of spaced depressions, and a transparent block secured in each depression, the transparent blocks having their inner surfaces silvered whereby light from within the casing may pass through the panel between the depressions, and whereby light from the outside of the casing will be reflected outwardly of the casing by the blocks.

In testimony whereof I affix my signature.

WILLIAM E. BEARD.